(12) United States Patent
Rees

(10) Patent No.: US 6,352,312 B1
(45) Date of Patent: Mar. 5, 2002

(54) VEHICLE SEAT INTERLOCK

(75) Inventor: Richard W. A. Rees, Greenville, MI (US)

(73) Assignee: Excellence Manufacturing, Inc., Grand Rapids, MI (US)

( * ) Notice: Subject to any disclaimer, the term of this patent is extended or adjusted under 35 U.S.C. 154(b) by 0 days.

(21) Appl. No.: 09/536,108

(22) Filed: Mar. 24, 2000

(51) Int. Cl.[7] .......................... B60N 2/42; B60R 21/00; A47C 1/024
(52) U.S. Cl. .................. 297/470; 297/473; 297/344.1; 297/216.1; 297/216.15; 297/216.16; 248/429
(58) Field of Search .................... 297/216.1, 216.13, 297/216.14, 216.15, 216.16, 216.18, 470, 344.1, 473, 463.1; 248/429, 503.1

(56) References Cited

U.S. PATENT DOCUMENTS

| | | | |
|---|---|---|---|
| 4,209,159 A | * 6/1980 | Becker et al. | 297/344.1 X |
| 4,262,963 A | * 4/1981 | Bauer et al. | 297/473 |
| 4,526,424 A | * 7/1985 | Korth | 297/473 |
| 4,673,217 A | * 6/1987 | Nishiyama et al. | 297/473 |
| 4,784,434 A | * 11/1988 | Iwami | 248/429 X |
| 4,818,022 A | * 4/1989 | Nishimura | 297/473 |
| 4,832,409 A | 5/1989 | Borlinghaus et al. | 297/468 |
| 4,881,781 A | 11/1989 | Borlinghaus et al. | 297/473 |
| 4,993,747 A | 2/1991 | Borlinghaus | 280/806 |
| 5,037,132 A | 8/1991 | Borlinghaus et al. | 280/801 |
| 5,087,009 A | 2/1992 | Borlinghaus et al. | 248/429 |
| 5,137,244 A | * 8/1992 | Negi | 248/429 X |
| 5,226,697 A | 7/1993 | Borlinghaus et al. | 297/216 |
| 5,322,348 A | * 6/1994 | Johnson et al. | 297/473 |
| 5,362,132 A | * 11/1994 | Griswold et al. | 297/344.1 X |
| 5,653,506 A | 8/1997 | Wisner et al. | 297/344.1 |
| 5,746,409 A | 5/1998 | Rees | 248/422 |
| 5,791,622 A | * 8/1998 | Gauger | 297/344.1 X |
| 6,089,665 A | * 7/2000 | Andrigo | 297/344.1 |

* cited by examiner

Primary Examiner—Jose V. Chen
Assistant Examiner—Rodney B. White
(74) Attorney, Agent, or Firm—VanDyke, Gardner, Linn & Burkhart, LLP

(57) ABSTRACT

A vehicle seat interlock mechanism includes a U-shaped channel member extending along a lower track of a seat and an interlock bracket mounted to a deformable mounting member at an upper track of the seat. The interlock bracket includes a seat belt anchor and a U-shaped channel at a lower end of the bracket. The interlock bracket is movable upwardly and forwardly in response to a seat belt force sufficient to deform the mounting member of the interlock bracket, whereby the two interlock channels engage to limit movement of the seat relative to the floor of the vehicle. The interlock bracket may include a portion extending forwardly over a gear box of a power drive system for the seat, such that the bracket is movable to compress the gear box to further retain the gear mechanism to a rack along the track assembly of the seat.

37 Claims, 13 Drawing Sheets

ID="1" />
VEHICLE SEAT INTERLOCK

BACKGROUND OF THE INVENTION

The present invention relates generally to vehicle seats and, more particularly, to a locking mechanism for vehicle seats which have the seatbelt secured thereto, such that additional restraints may be necessary to withstand the forces exerted by the seatbelt during sudden decelerations of the vehicle.

Vehicular seats, such as a driver seat and passenger seat, are typically mounted to a track assembly which allows for forward and rearward adjustment of the seat relative to the floor of the vehicle. Typically, a lower portion of the track assembly is anchored to the floor while an upper portion moves along the lower portion and supports a seat pan support for the seat cushion and/or seat back. Because the seat tracks may not be capable of withstanding the excessive loading of a safety belt system, which can exert extremely high forces during a sudden deceleration or collision, the safety belts in many vehicles are secured to the floor pan of the vehicle. While this provides a secure anchor for the safety belt system, the passenger or driver may have to re-adjust the seat belt after adjusting the seat position.

Many vehicle manufacturers today want the safety belts to be anchored directly to the seats, to improve the overall comfort of the passengers within the vehicle. However, the seats and the associated track assemblies must then be designed to withstand a much greater force from the seat belt during a collision, in order to prevent the seat from being dislodged from its base or pedestal. Several seat belt anchoring systems have been proposed which provide additional restraints to prevent vertical movement of the seat during collision. However, some of these restraints provide resistance to vertical movement of the seat relative to the base, but do not limit forward movement of the seat. Additionally, many of these devices include multiple moving components and/or spring mechanisms, and thus may not be easily implemented along the seat track assembly.

SUMMARY OF THE INVENTION

The present invention is intended to provide a seat interlock mechanism for a seat of a vehicle which does not interfere or restrain movement of the seat in a forwardly and/or rearwardly direction during normal operation of the seat. However, during a sudden deceleration of the vehicle, such as during a collision, the interlock mechanism may function to engage a pair of corresponding channels to restrict movement of the seat relative to the vehicle. The present invention provides an interlock bracket at an upper track portion of the seat which is movable to engage a corresponding channel at a lower track portion in response to a seat belt force exerted at the bracket which is sufficient to deform a mounting member for the interlock bracket.

According to a first aspect of the present invention, a seat interlock mechanism for retaining a seat of a vehicle to a seat base during a sudden deceleration of the vehicle comprises a deformable mounting member, a first channel member, an interlock bracket, and a seat belt mount positioned at the mounting member and/or the interlock bracket. The seat is adjustable forwardly and rearwardly along a track assembly and the interlock mechanism is positionable along at least one side of the seat. The mounting member extends laterally outwardly from at least one side of the track assembly of the seat. The first channel member is positionable at the seat base and at least partially along the track assembly. The interlock bracket is positionable at an upper track of the track assembly and includes a second channel member extending downwardly therefrom. The second channel member is positioned along the first channel member and at least initially spaced therefrom. The interlock bracket is movable to engage the second channel member with the first channel member in response to a seat belt force at the seat belt mount which is sufficient to deform the mounting member.

Preferably, the first and second channels of the interlock mechanism include corresponding teeth or notches, such that the channels non-slidably engage one another in response to the sufficient seat belt force.

In one form, the deformable mounting member is a torsion tube extending laterally across the seat and mounted at each end to an upper portion of the track assembly. The interlock bracket then rotatably receives the torsion tube therethrough, such that rotational movement of the torsion tube does not cause any corresponding movement of the interlock bracket. Preferably, the seat is a powered adjusting seat and the interlock bracket further includes an arm extending forwardly therefrom to engage and compress a portion of the adjustment mechanism at the track assembly in response to deformation of the mounting member. The compression of the adjustment mechanism retains the adjustment mechanism in full engagement with the track assembly of the seat and further limits or precludes forward motion of the seat relative to the floor of the vehicle.

According to another aspect of the present invention, a seat for a vehicle having a floor comprises a seat base securable to the floor of the vehicle, a track assembly, a seat support, a mounting member extending laterally and at least partially across the seat, a seat interlock mechanism, and a seat belt mount. The track assembly comprises an upper track and a lower track, with the lower track being secured along the seat base. The seat support is mounted to the upper track. At least one end of the mounting member extends laterally outwardly from the upper track. The seat interlock mechanism comprises a first channel positioned along the lower track and an interlock bracket mounted at the upper track and/or the laterally extending end of the mounting member. The interlock bracket includes a second channel which is aligned with and at least initially spaced from the first channel. The seat belt mount is positioned at the interlock bracket and/or the laterally extending end of the mounting member. The interlock bracket is operable to engage the second channel with the first channel in response to a seat belt force at said seat belt mount which is sufficient to deform at least one of the mounting member and the interlock bracket.

Preferably, the interlock bracket comprises a first panel and a second panel connected at least partially along an upper edge thereof. The first panel is secured to the upper track and the second panel is positioned laterally outwardly from the first panel. The mounting member extends through both first and second panels. Preferably, the mounting member is a rotatable torsion tube extending laterally across the seat for raising and lowering the seat via a powered seat mechanism. The torsion tube is rotatably received by the first and second panels of the interlock bracket.

In one form, the second or outer panel may receive the mounting member through a slotted opening to provide a time delay between an initial deformation of the mounting member and engagement of the first and second channels of the interlock mechanism. The desired time delay may be achieved through adjustment of the size of the slotted opening. Additionally, a time delay may be adjusted by varying the diameter and/or thickness of the walls of the mounting member and/or by varying the materials of the mounting member.

According to another aspect of the present invention, an interlock mechanism substantially limits forward movement of a power seat adjuster of a vehicle in response to a seat belt force exerted at the seat. The power seat adjuster is mounted at a track assembly and has a drive mechanism which is operable to rotatably actuate at least one gear member at a rack extending along the track assembly for adjusting the seat forwardly and rearwardly along the track assembly. The interlock mechanism comprises an interlock bracket which is mounted at the track assembly. The seat belt is anchored at the interlock bracket, which includes an engaging portion extending therefrom. The engaging portion is at least initially positioned adjacent to the gear member at the track assembly. The engaging portion is operable to engage and compress the gear member to retain engagement of the gear member to the rack to substantially limit forward movement of the seat in response to a seat belt force sufficient to move the interlock bracket and thus engage the engaging portion with the gear member. Compression of the gear member to the rack locks the track assembly and substantially limits or precludes slippage of the gear along the rack, which would otherwise allow forward movement of the seat during a sudden deceleration of the vehicle.

Accordingly, the present invention provides a seat interlock mechanism which functions to substantially preclude forward movement of the seat during a sudden deceleration of the vehicle via deformation or distortion of a mounting member for the interlock mechanism. The mounting member may be a torsion tube extending laterally across the seats, such that the present invention may easily be adapted for implementation on an existing design of a seat. Alternately, the mounting member may be a laterally extending member which is secured to an upper portion of the track assembly and extends laterally outwardly therefrom. The interlock mechanism is operable to substantially preclude forward movement of the seat in response to an excessive force exerted by the seat belt at the seat belt anchor, while allowing unrestricted movement of the track assembly of the seat during normal operation prior to deformation of the mounting member.

These and other objects, advantages, purposes and features of this invention will become apparent upon review of the following specification in conjunction with the drawings.

DESCRIPTION OF THE PREFERRED EMBODIMENTS

Figure 1:
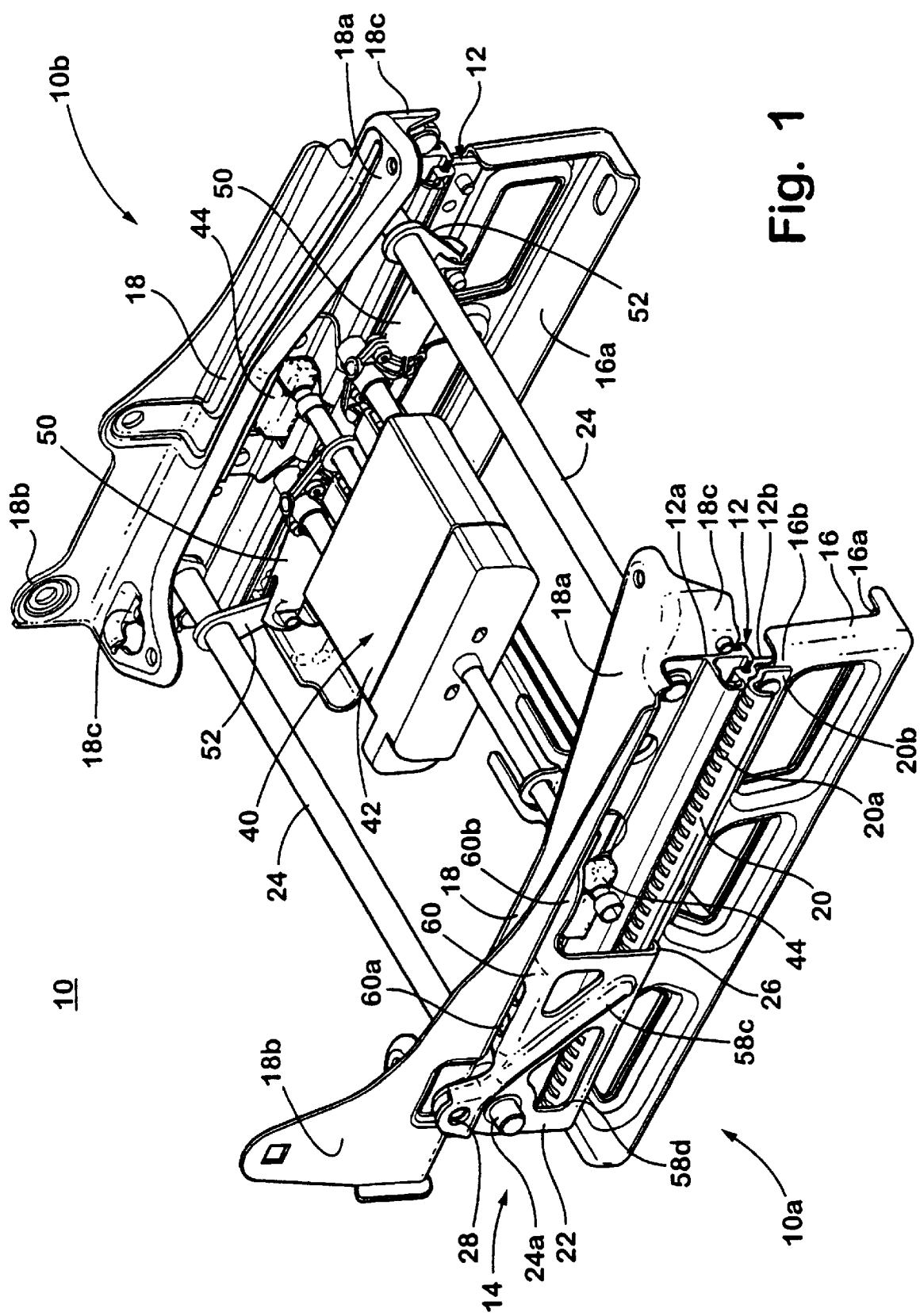
FIG. 1 is a perspective view of a seat support mechanism in accordance with the present invention.
Figure 12:
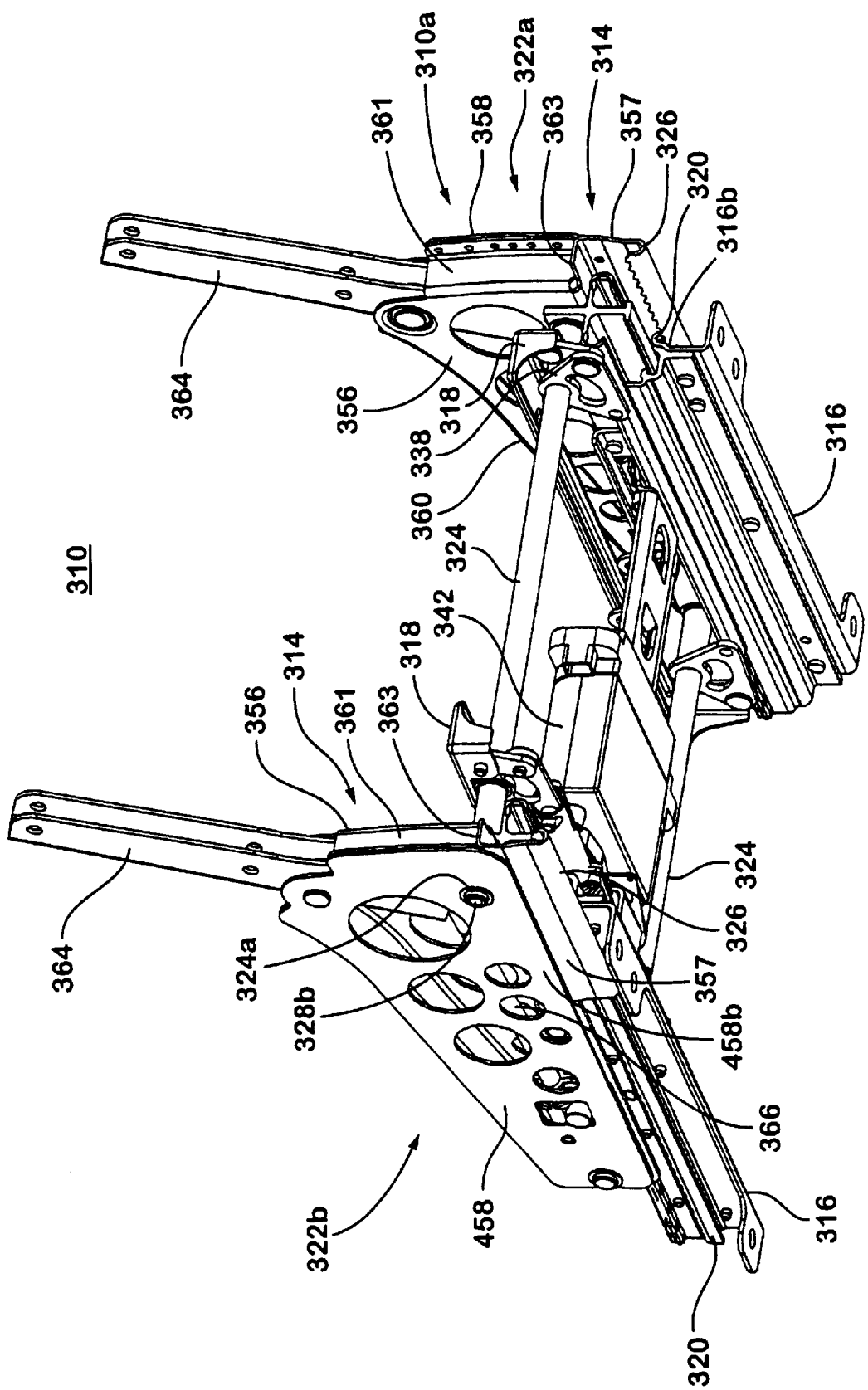
FIG. 12 is a lower rear perspective view of the seat assembly of FIG. 11.

Referring now specifically to the drawings and the illustrative embodiments depicted therein, an automotive seat assembly 10 includes a track assembly 12 and an interlock mechanism 14 (FIGS. 1–5). The track assembly 12 includes an upper track 12a and a lower track 12b positioned along both sides of seat assembly 10. Lower track 12b is secured to a base or pedestal 16 which is secured to the floor of the vehicle, while a seat support 18 is mounted at and/or along upper track 12a of track assembly 12, such that seat support 18 is movable in a forwardly and rearwardly direction relative to the floor of the vehicle via track assembly 12. Interlock mechanism 14 comprises a lower channel member 20 fixedly secured at base 16 and/or lower track 12b and an interlock bracket 22, which is mounted to an elongated mounting bar or member or torsion tube 24 extending laterally outwardly from at least one side of seat assembly 10. A seat belt mount or anchor 28 for mounting a seat belt thereto is provided at interlock bracket 22 (as shown in FIG. 1) or at an end 24a of mounting member 24 (as shown in FIG. 12). Interlock bracket 22 includes a second channel 26, and is movable to engage channel 26 with fixed channel 20 in response to a seat belt force at seat belt anchor 28 which is sufficient to deform mounting member 24, as discussed in detail below. Engagement of channels 26 and 20 substantially limits or precludes forward and/or upward movement of the seat relative to the vehicle during a sudden deceleration or collision of the vehicle.

Seat assembly 10 is shown as a six-way power seat, which is operable to adjust the seat forwardly and rearwardly with respect to the vehicle floor and to adjust the height of the seat. However, the present invention is equally applicable to other types of seats, such as four-way power seats, eight-way power seats and the like, and even unpowered manually adjustable seats. Seat assembly 10b is shown in FIG. 1 as a driver seat of a vehicle, with interlock mechanism 14 and seat belt anchor 28 being positioned at an inboard side 10a of seat assembly 10 with respect to the vehicle. An additional seat belt anchor (not shown) may be positioned at the other side or outboard side 10b of the seat assembly 10, and a third seat belt anchor may be included for a shoulder belt at the seat back frame (also not shown). Preferably, an interlock mechanism 14 is positioned at each side of seat assembly 10 which includes a seat belt anchor, since the interlock mechanism is engagable in response to a force being exerted by the seat belt which is great enough to deform the mounting member 24.

Figure 2:
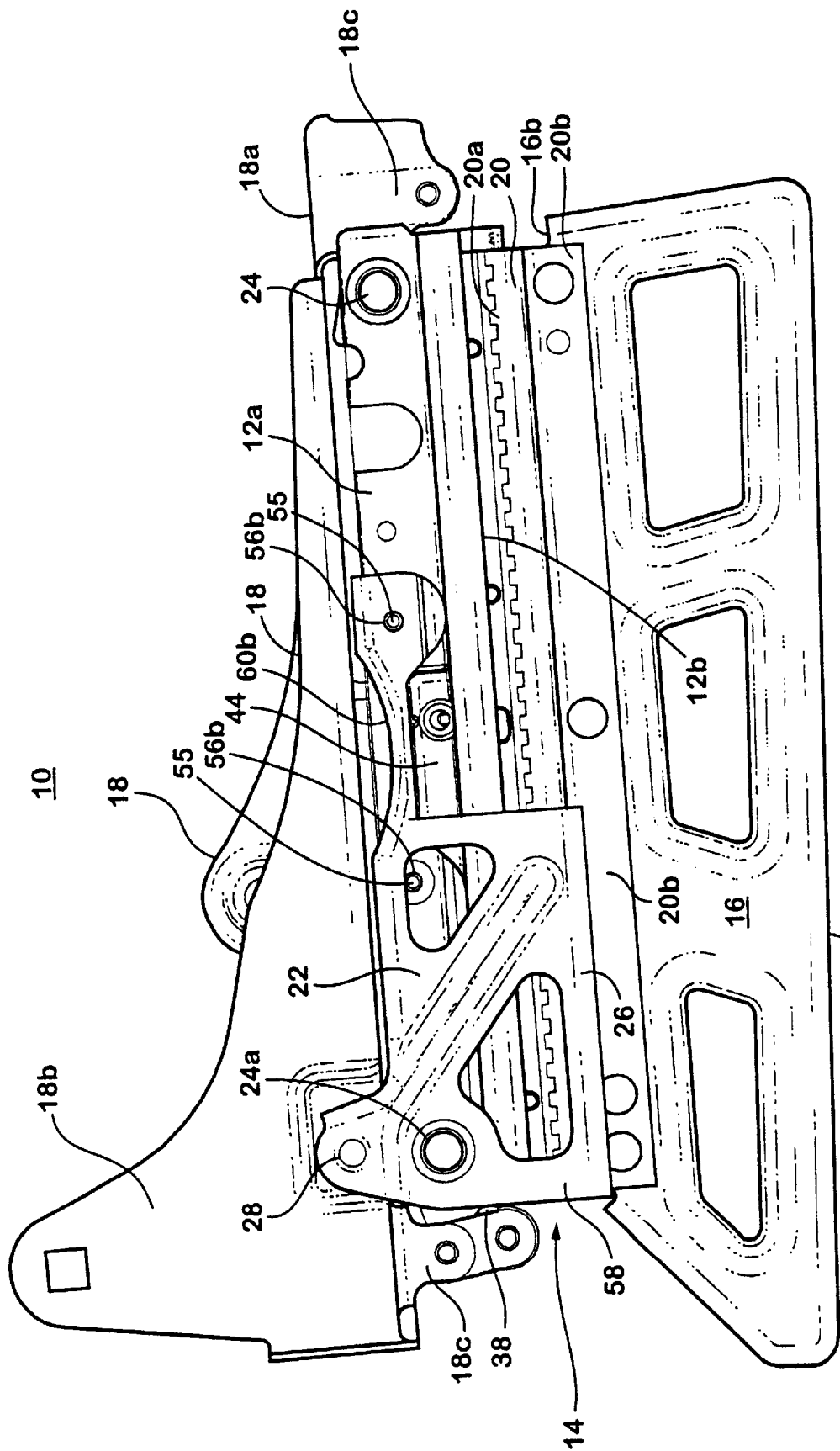
FIG. 2 is a side elevation of the seat mechanism of FIG. 1.
Figure 6:
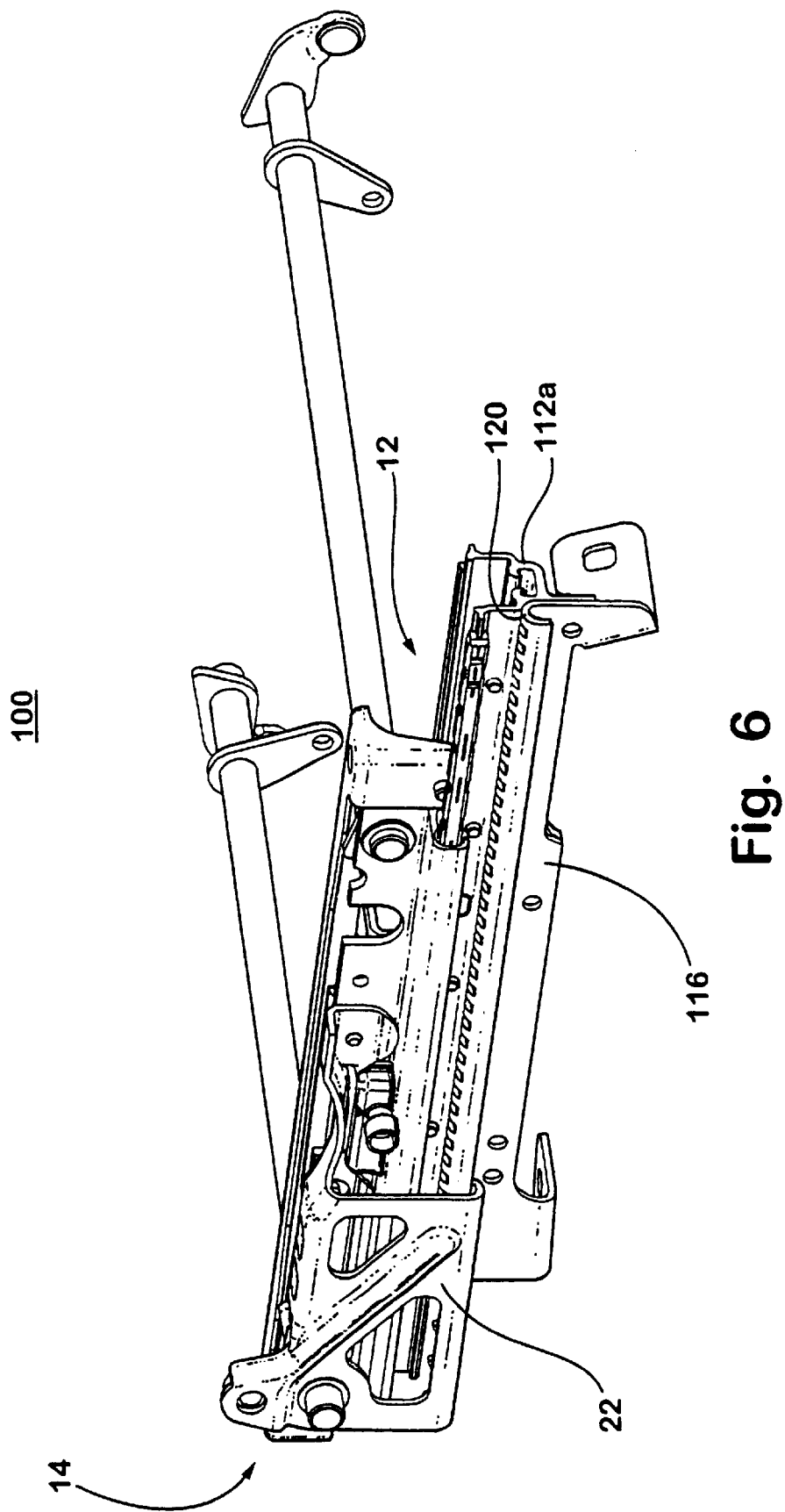
FIG. 6 is a perspective view of an alternate embodiment of one side of a seat assembly in accordance with the present invention.

As shown in FIGS. 1 and 2, base or pedestal 16 of seat assembly 10 extends longitudinally along both sides 10a and 10b of seat assembly 10. Each base 16 includes a lower floor mounting portion 16a for securing the base 16 to the floor of the vehicle by any known fastening means. Lower track 12b is welded, bolted, or otherwise secured along an upper edge or portion 16b of base 16. Interlock channel 20 is also secured along upper portion 16b of base 16, generally alongside lower track 12b and preferably on an outboard side thereof with respect to the seat. Although shown as a raised pedestal, base 16 may be otherwise formed to position lower track 12b and channel 20 at a lower level, and channel member 20 may be integrated with base 16, as shown in FIG. 6, without affecting the scope with the present invention.

Figure 4:
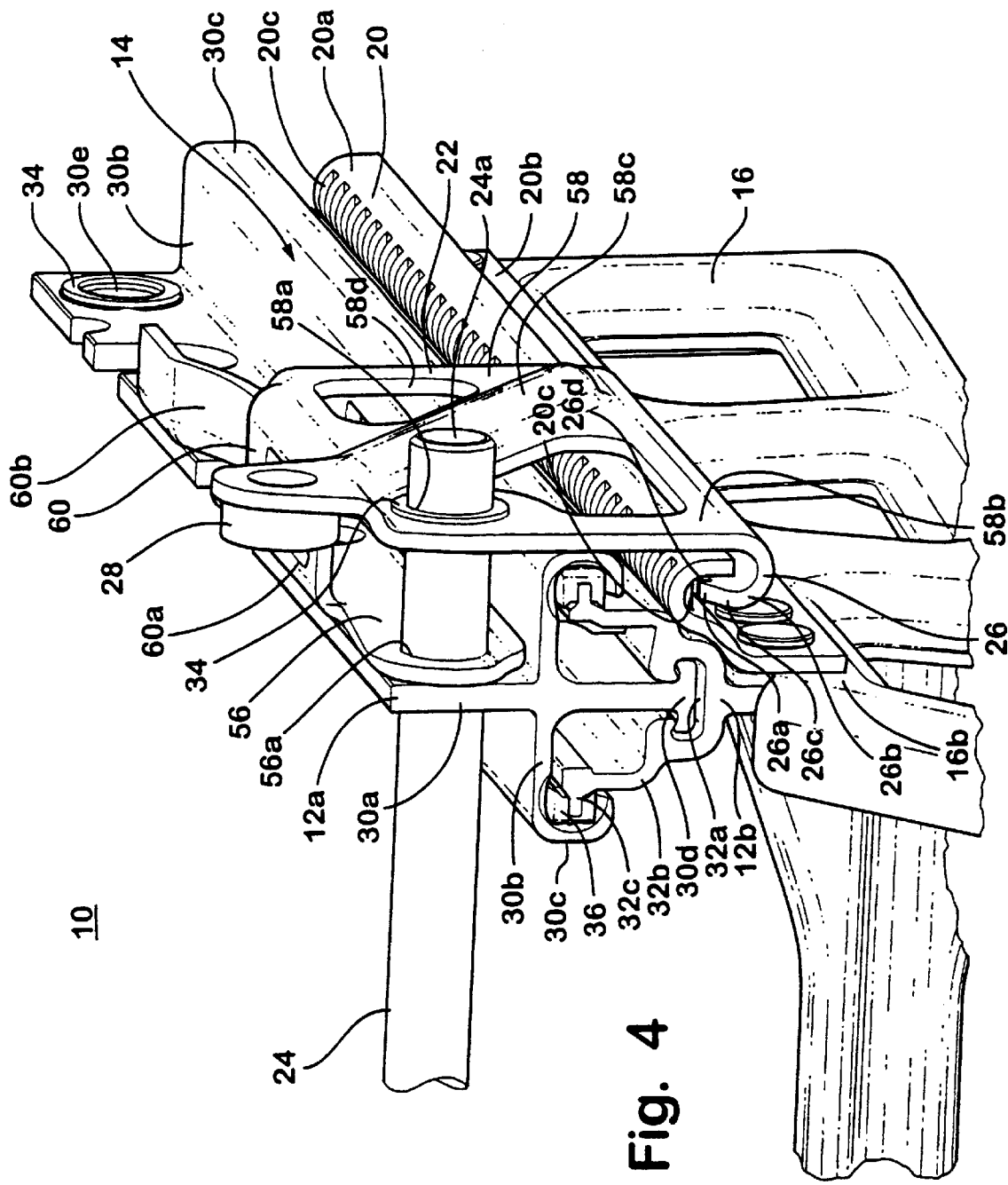
FIG. 4 is a rear perspective view of the track assembly and interlock mechanism of the seat assembly of FIG. 1, with the seat pan support removed.
Figure 5:
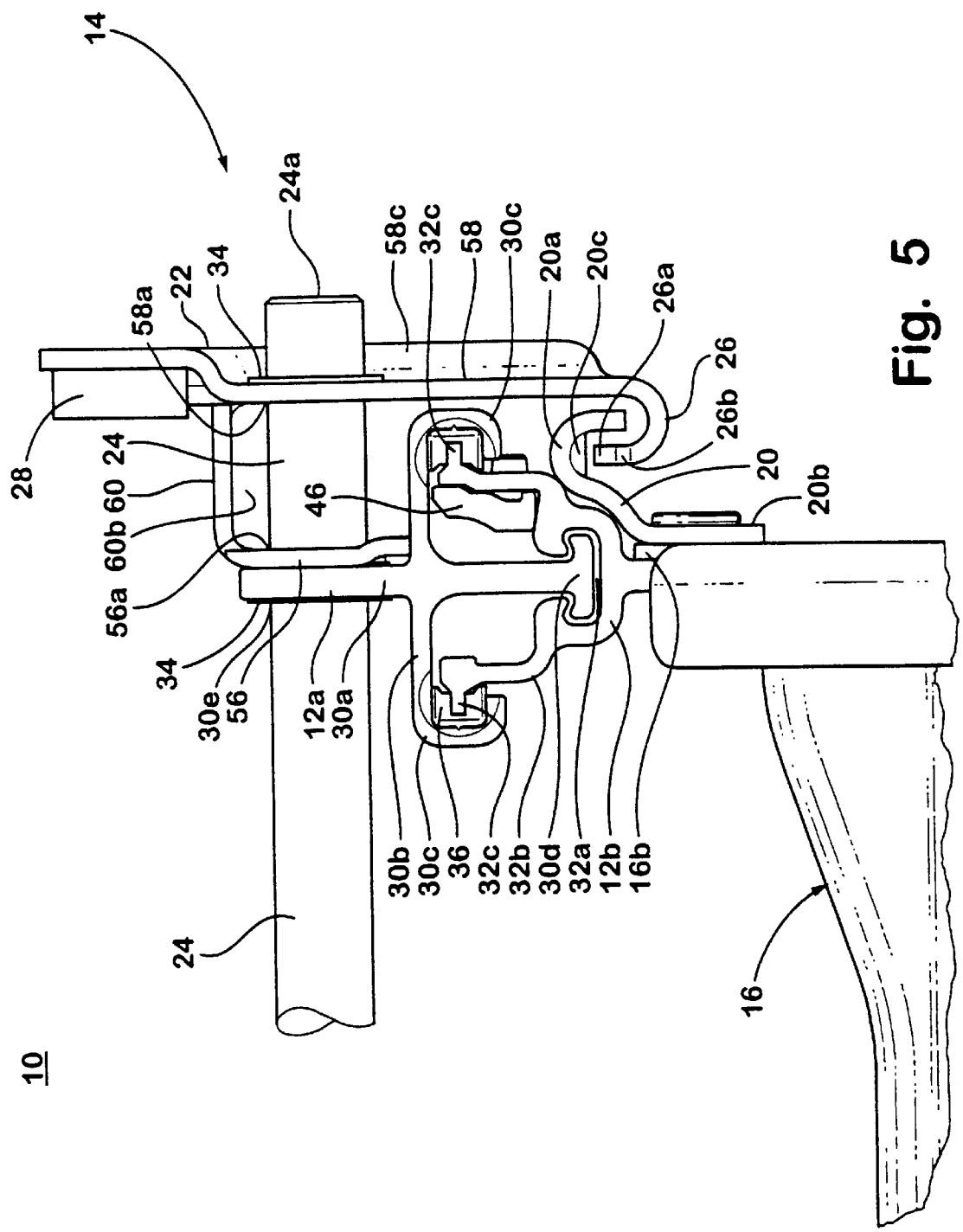
FIG. 5 is a rear elevation of the track assembly and interlock mechanism of FIG. 4.

As best shown in FIGS. 4 and 5, upper track 12a slidably engages lower track 12b, such that upper track 12a is slidable forwardly and rearwardly along lower track 12b with respect to base 16 in the floor of the vehicle. Preferably, track assembly 12 is of the type disclosed in commonly assigned U.S. Pat. No. 5,746,409, issued to Richard W. A. Rees on May 5, 1998, the disclosure of which is hereby incorporated herein by reference. Because the upper and lower tracks 12a and 12b are described in detail in the above-referenced patent, a detailed discussion will not be repeated herein. Suffice it to say that upper track 12a comprises a vertical web 30a and a horizontal web 30b, which includes a pair of inwardly opening channels 30c along the outer ends thereof. The vertical web 30a includes a lower horizontal flange 30d at a lower end thereof, for engagement with a correspondingly formed channel 32a along lower track 12b. A pair of generally circular openings of 30e may be provided through vertical web 30a above horizontal web 30b for receiving the elongated torsion tubes 24 therethrough. A bushing 34 may also be provided in the openings 30e to rotatably receive the tubes 24 therethrough.

Lower track 12b is correspondingly formed with upper track 12a, and is preferably generally U-shaped with a pair of sidewalls 32b extending upwardly from lower channel 32a. A longitudinal track flange 32c extends outwardly from an upper end of each side wall 32b and is received within a bearing shoe 36, which provides slidable engagement of flanges 32c along channels 30c at upper track 12a. Although track assembly 12 is shown and described as having the upper and lower tracks formed as shown in the figures, clearly the present invention may be implemented on a seat assembly which comprises any form of track assembly, such as conventional track assemblies and the like, without affecting the scope of the present invention.

Figure 3:
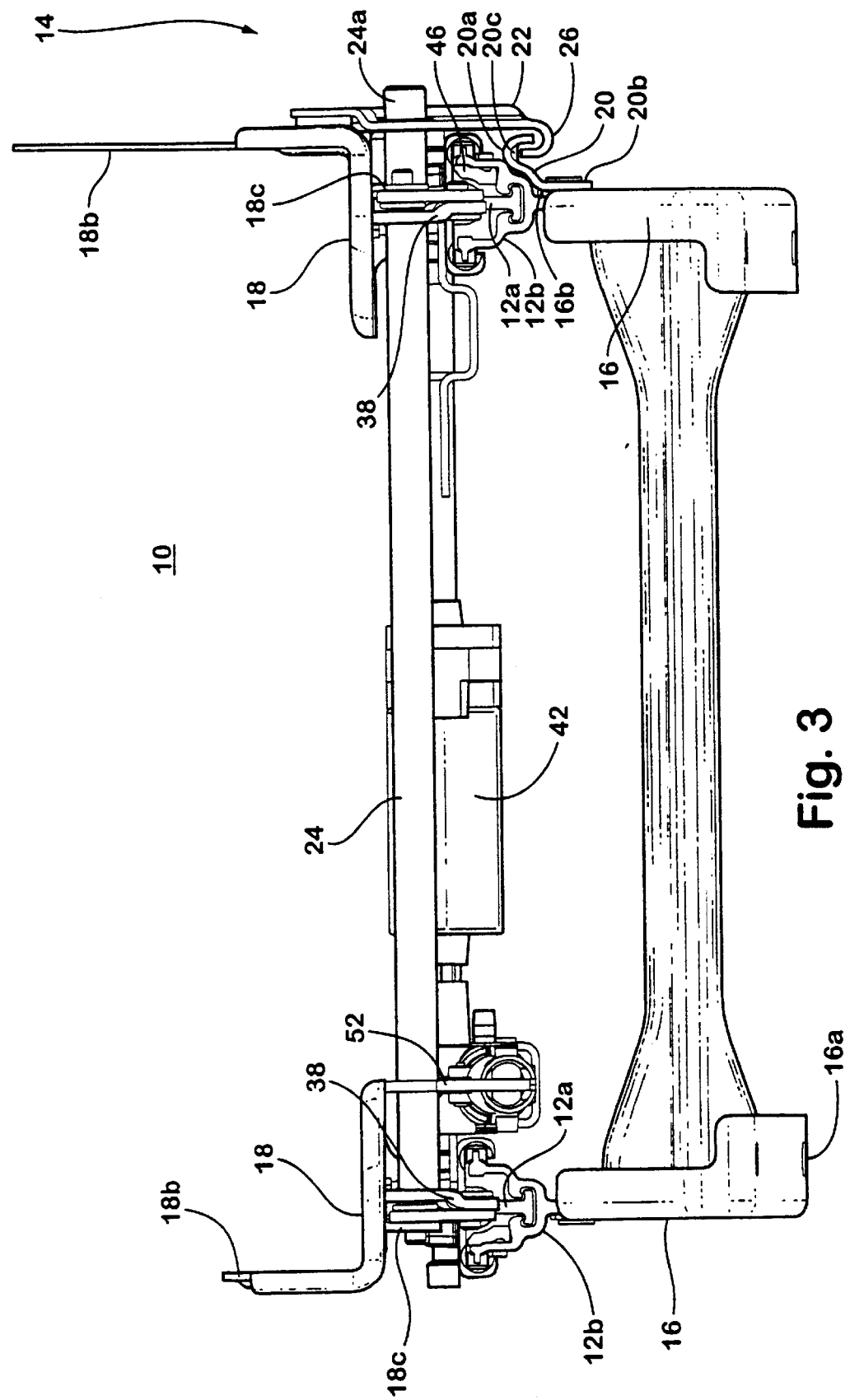
FIG. 3 is a rear elevation of the seat assembly of FIG. 1, looking forwardly with respect to the direction of the vehicle.
Figure 11:
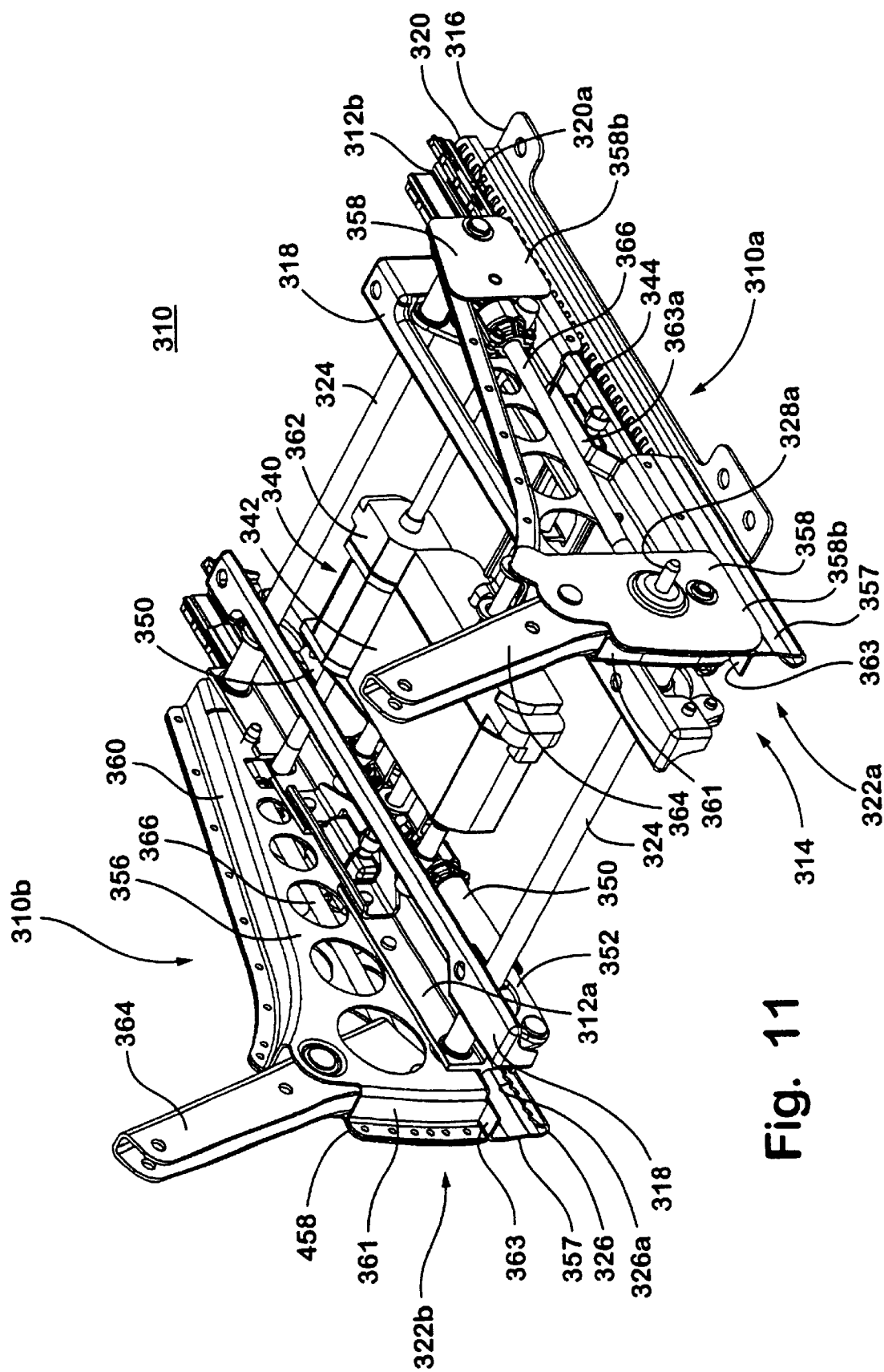
FIG. 11 is an upper rear perspective view of another alternate embodiment of a seat assembly in &dance with the present invention.
Figure 13:
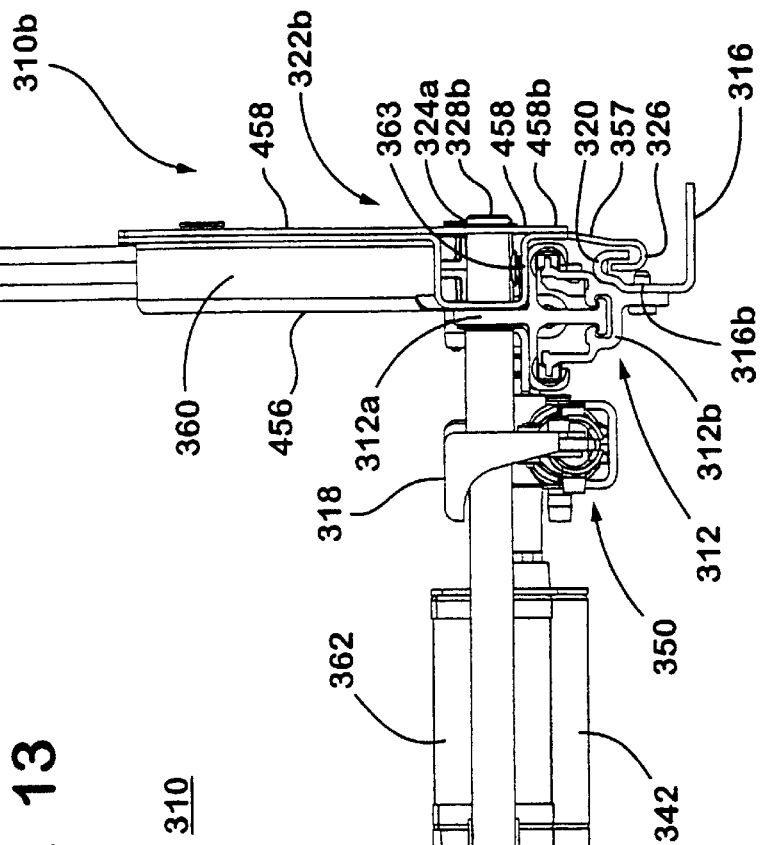
FIG. 13 is a front end elevation, looking rearwardly with respect to the vehicle, of the seat assembly of FIG. 11

If the seat assembly 10 comprises a height adjustment mechanism, a torsion tube 24 may be provided to adjust the height of the seat via rotation of the tube, as discussed below. Torsion tube 24 extends laterally across the assembly 10 at a forward and rearward portion thereof, and is rotatably received within bushings 34 and openings 30e along upper track 12a. Each torsion tube 24 may further include a pair of mounting arms 38, as best shown in FIGS. 2 and 3 (FIGS. 4 and 5 are shown with the mounting arms and seat support removed to provide a clear view of the track assembly 12 and interlock bracket 22). Mounting arms 38 are secured toward an outer end of torsion tubes 24, and preferably laterally inward from upper track 12a, and extend generally forwardly or rearwardly therefrom, as shown in FIG. 1. Mounting arms 38 are interconnected to corresponding mounting arm flanges 18c of seat support bracket 18, such that rotation of torsion tube 24 causes an upward or downward movement of seat support 18, as is known in the art. The movement of seat support 18 may correspondingly raise or lower the seat back, if the seat back bracket 18b is attached to seat support 18, or may raise or lower the seat independent of the seat back, if the seat back bracket is mounted at the base or track assembly (as shown in FIGS. 11–13).

Seat support 18 provides a mounting surface 18a for the seat cushion and the like (not shown), and may further provide a mount for the back of the seat (also not shown). More articulately, seat support bracket 18 includes a substantially level seat or cushion support surface 18a and may further include a seat back mounting flange or recliner mount 18b, which extends upwardly from a rearward portion of seat support 18. Additionally, a mounting arm flange 18c extends downwardly from each end of each seat support 18 for attaching mounting arms 38 thereto. Because interlock bracket 22 and torsion tubes 24 are secured to upper track 12a of track assembly 12, and seat support 18 is mounted to torsion tubes 24 via mounting arms 38, seat support 18 and interlock bracket 22 are movable with upper track 12a along lower track 12b and channel 20 when the seat is adjusted forwardly and rearwardly.

Seat assembly 10 may be a powered seat assembly, which includes a drive mechanism 40 for electrically adjusting a portion of the seat relative to the base. Drive mechanism 40 comprises a power seat motor 42, which is operable to drive a gear box assembly 44 at each side 10a and 10b of seat assembly 10. The gear box assemblies 44 may comprise drive gears and the like (not shown) for engaging a rack 46 along track assembly 12, such that rotation of the drive gears causes a forward and rearward adjustment of upper track 12a relative to lower track 12b, as is known in the art. Additionally, the seat motor 42 may be operable to drive a front and rear actuator 50, which causes pivotal movement of a pair of drive arms 52 about the torsion tubes 24, which further causes rotation of torsion tubes 24 to raise and lower the seat as is known in the art. The drive mechanism 40 may further function to adjust an angle of the seat back, as shown in FIGS. 11–13, and/or may provide other adjustments to seat assembly 10, without affecting the scope of the present invention. Alternately, seat assembly 10 may comprise a manual seat, such that forward and rearward adjustment of the seat, and maybe even vertical adjustment, are provided by a mechanical lever or the like which allows desired movement of the seat when actuated, as is well known the art. In applications where the seat is not vertically adjustable or otherwise does not include a torsional cross member or bar, the interlock bracket may be mounted at a mounting member which is secured to the upper track and extends laterally outwardly therefrom, without affecting the scope of the present invention.

As best shown in FIG. 4, lower channel 20 of interlock mechanism 14 is secured along an upper portion 16b of base 16. Channel member 20 comprises an inverted, generally U-shaped channel 20a extending upwardly and laterally outwardly from an attaching rail 20b. Channel 20a may be curved laterally outwardly from base 16 corresponding to the form of sidewalls 32b of lower track 12a, as best seen in FIGS. 3–5. However, channel member 20 may be otherwise formed depending on the shape of lower track member 12b and/or base 16, without affecting the scope of the present invention. Preferably, U-shaped channel 20a of channel member 20 comprises a plurality of notches or teeth 20c spaced therealong. Preferably, the notches 20c are semi-shears which are formed by a plurality of downward depressions along the channel 20a.

Bracket 22 of interlock mechanism 14 preferably comprises an inner mounting plate or flange 56 (FIGS. 4 and 5) and an outer generally vertical plate or flange 58, which are interconnected along upper edges thereof via a generally horizontal plate or flange 60. Mounting flange 56 and outer flange 58 both include an opening 56a and 58a, respectively, therethrough for receiving torsion tube 24, and maybe a bushing 34. Outer plate 58 may further include seat belt anchor or mount 28, which may be a reinforced opening for receiving a mounting pin of the seat belt mechanism, or may be a outwardly extending mounting pin or spindle for engagement with the seat belt mechanism or any other means for allowing attachment of either end of a seat belt. Alternately, seat belt anchor 28 may be provided at outer end 24a of mounting member or torsion tube 24, without affecting the scope of the present invention. Bracket channel 26 is positioned along a lower end 58b of outer plate 58 and is generally U-shaped and curves inwardly and upwardly from lower end 58b of outer plate 58. A plurality of raised projections or teeth or notches 26a are preferably formed along an upper edge of an upwardly turned portion 26b of U-shaped channel 26. Preferably, teeth 26a are sloped or angled at their rearward edge 26c and provide a stepped face on their forward edge 26d, such that forward movement of bracket 28 relative to lower channel 20 is substantially precluded by engagement of the stepped face 26d of the teeth 26a with the stepped notches or teeth 20c along inverted fixed channel 20. Outer bracket 58 preferably further includes one or more ribs or folds 58c therealong to enhance the strength and rigidity of outer plate 58 of interlock bracket 22, and may further include one or more apertures 58d formed therethrough to reduce the mass of the seat assembly.

Upper flange 60 secures outer plate 58 to inner plate 56 and preferably includes a plurality of openings or apertures 60a therethrough. The openings 60a reduce the mass of the bracket 22 and further enable the upper flange 60 to buckle to allow relative movement between inner and outer plates 56 and 58, as discussed below. Upper flange 60 preferably further include a downwardly curved, narrowed section 60b toward a forward end, such that curved section 60b is positioned generally over gear box 44, as shown in FIGS. 1 and 2. Upper flange 60 is operable to engage curved section 60b with gear box 44 in response to a sudden deceleration of the vehicle, as discussed below.

When assembled to seat assembly 10, inner plate 56 of interlock bracket 22 is secured, such as via fasteners or rivets or the like through one or more openings 56b in inner plate 56, along upper track 12a. Inner plate 56 may then be secured to upper track 12a via rivets or other fastening means 55 (FIG. 2) at either or both sides of the curved narrowed section 60b. Inner plate 56 is secured to upper track 12a such that torsion tube opening 56a is aligned with opening 30e in upper track 12a. Opening 56a preferably has a diameter which is greater than the diameter of torsion tube 24, in order to allow rotation of tube 24 therewithin.

Outer plate 58 is positioned such that U-shaped channel 26 aligns with U-shaped channel 20a, with upwardly extending portion 26b extending partially within channel 20a. However, teeth 26a are spaced downwardly from notches or teeth 20c to allow for smooth forward and rearward movement of the seat without any interference from the interlock mechanism 14 during normal use of the seat. As best seen in FIGS. 4 and 5, torsion tube or mounting member 24 extends outwardly through upper track 12a and inner plate 56, and further through outer plate 58 of interlock bracket 22. Torsion tube 24 is rotatably received within the openings 30e, 56a and 58a of upper track 12a, inner plate 56 and outer plate 58, respectively, such that rotation of torsion tube 24 does not result in twisting or rotating of bracket 22 with respect to track assembly 12. The openings 56a and/or 58a may be of a greater diameter than mounting member 24 to allow clearance between mounting member 24 and bracket 22, or may include a bushing 34 or the like to rotatably secure the mounting member within the openings.

Upon a sudden deceleration of the vehicle, such as a collision or the like by the vehicle, the forward inertia of the occupant of the seat will pull against the seat belt. This movement exerts a substantial amount of force at the seat belt anchor 28 and the seat belt anchor on the other side of the seat, which may be at the seat assembly or at the floor of the vehicle. Depending on the degree of acceleration, such forces may be extremely high at the seat belt anchors and may result in slipping of the gears of gear box 144 along rack 46 and/or stripping of the upper track 12a from lower track 12b. Upon initial deceleration, forward movement of the seat assembly is limited by the gears and rack at the track assembly. Because seat belt anchor 28 is positioned at outer plate 58 of bracket 22, the force exerted by the seat belt is translated to the outer end 24a of mounting member or torsion tube 24. Mounting member 24 is generally anchored at upper track 12a and inner plate 56 of bracket 22, such that the force exerted at outer end 24a of mounting member 24 via the seat belt, seat belt anchor 28 and outer plate 58 of bracket 22, creates a moment arm at outer end 24a of mounting member 24 about the attachment point of mounting member 24 at upper track 12a. When the force at seat belt anchor 28 is great enough, the torsion tube will bend, twist or otherwise deform at or near upper track 12a and laterally outward therefrom, to allow outer plate 58 of bracket 22 to move forwardly and upwardly, such that teeth 26a of channel 26 move upwardly and engage teeth 20c within channel 20a of interlock mechanism 14. Upper surface 60 of bracket 22 functions to partially buckle in response to such movement, in order to allow upward movement of outer plate 58 relative to inner plate 56, which is generally secured to upper track 12a. Engagement of the channels 20a and 26 substantially locks the seat assembly such that relative movement between the upper and lower track members 12a and 12b is substantially precluded.

Additionally, in response to the upward and forward movement of outer plate 58, bracket 22 further functions to cause the downwardly curved section 60b of upper flange 60 to buckle and be driven downwardly into gear box 44. Downward buckling of narrowed section 60b is provided by a generally forward force being exerted at a rearward end 60c of curved section 60b, which is generally secured at each end via fasteners or the like along inner plate 56. Because curved section 60b is initially curved in a downward direction, the forward force at end 60c causes downward flexing and/or buckling of curved section 60b. This buckling of curved section 60b results in the compression or crushing of the gear box 44 to further lock the worm gear to the rack along the track sections and further prevent slipping of the gears along the track sections. Such locking provides additional securement of the seat tracks to further preclude forward movement of the seat during the collision of the vehicle.

Figure 8:
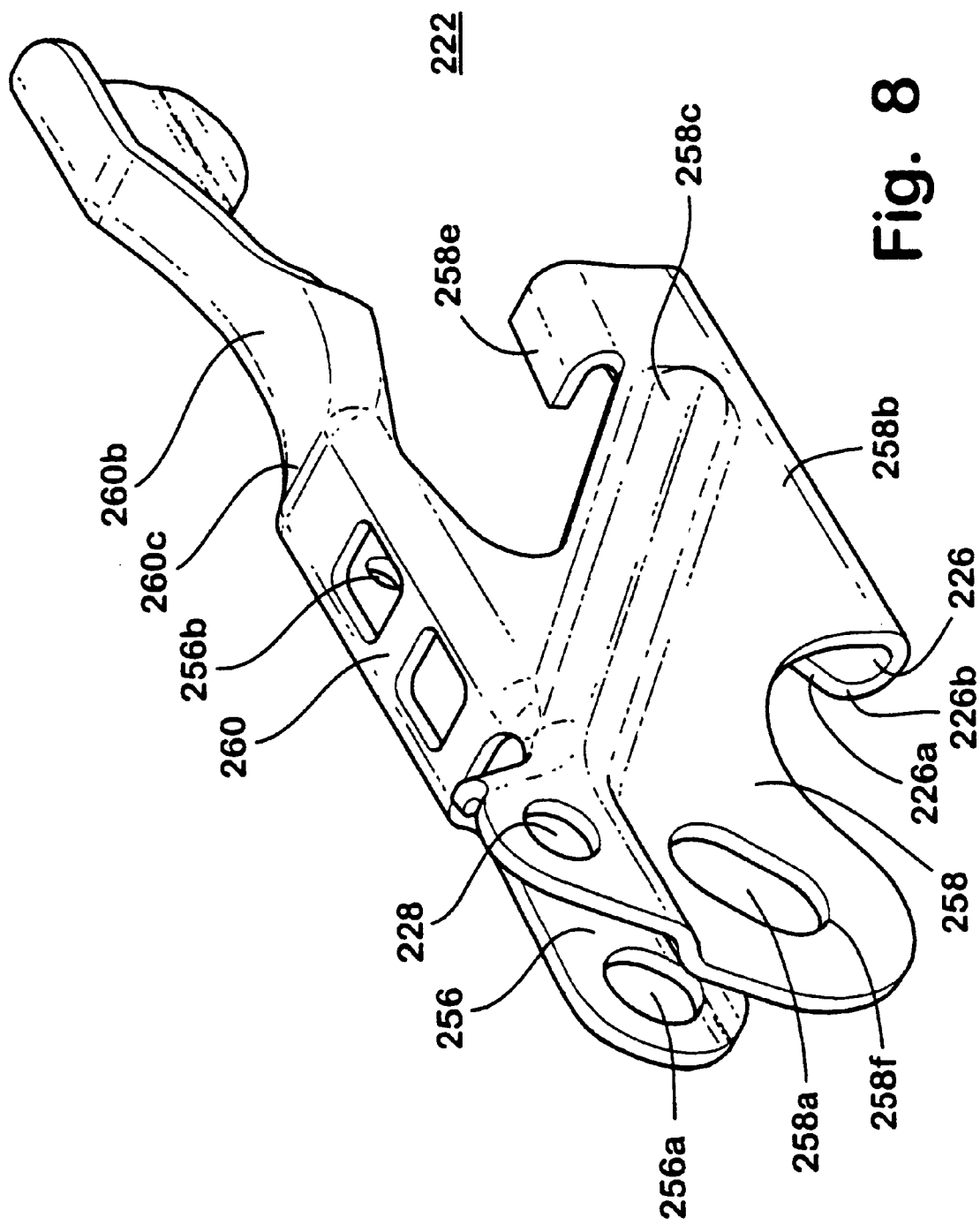
FIG. 8 is another alternate embodiment of an interlock bracket useful with the present invention.
Figure 10:
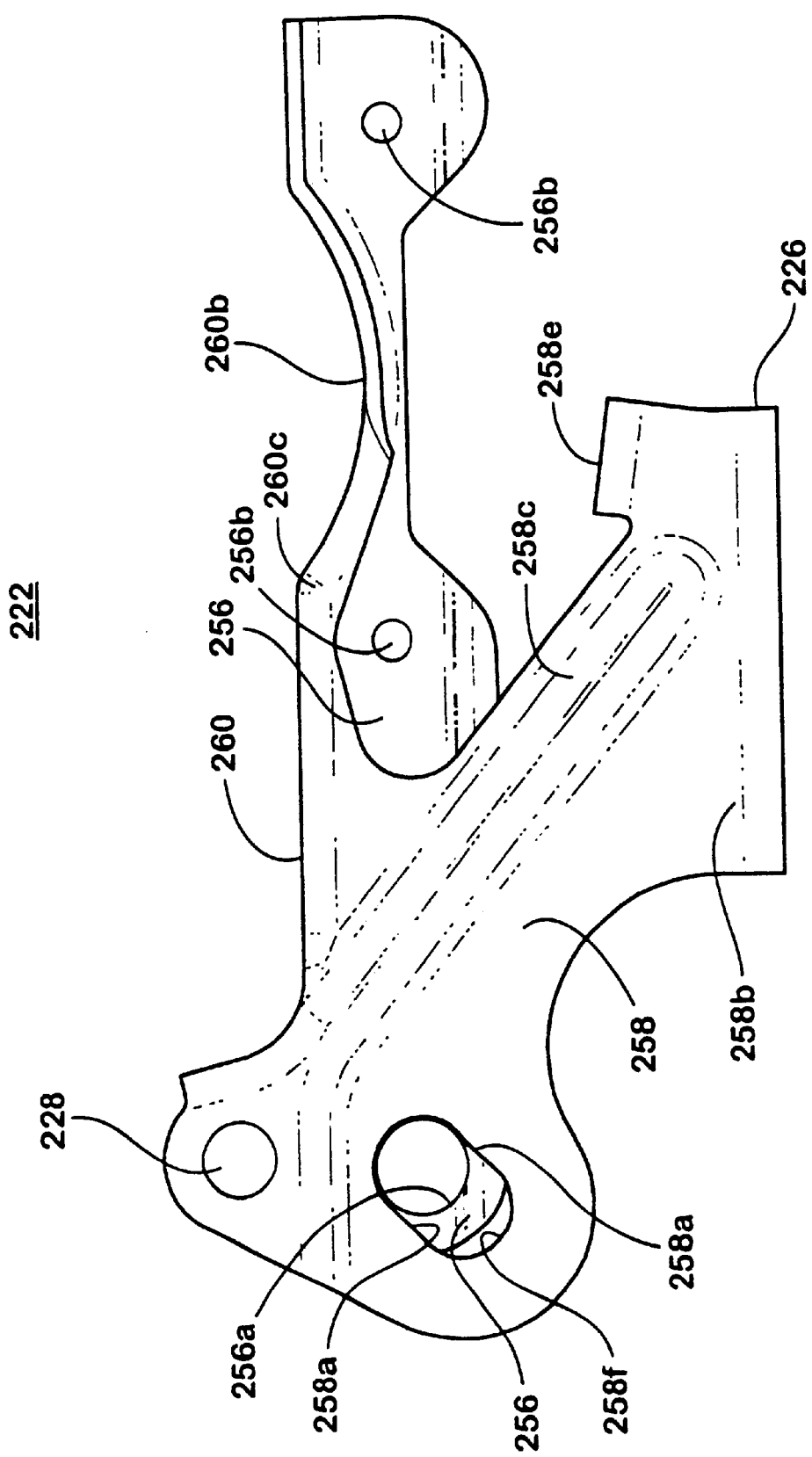
FIG. 10 is a side elevation of the interlock bracket of FIG. 8.

During a sudden deceleration and/or collision of the vehicle, the interlock mechanism is engaged within a very short period of time following the initial forces exerted at the seat belt. Because the dynamic effects of a collision may vary between different vehicle and seat designs, it is desirable in some cases to vary the time delay and/or force requirements between an initial deceleration and engagement of the interlock mechanism. Accordingly, interlock mechanism 14 may be adjusted to vary the response time for engagement of the channel members 20 and 26 and/or to require a greater or lesser force at the seat belt anchor to actuate the mechanism. For example, the threshold force required to deform the mounting member may be varied by selection of the material of the mounting member, i.e., a stronger material (with a higher yield modulus) may be selected to increase the force threshold and thus delay deformation of the mounting member. Alternately, because torsion tubes may be hollow tubes, increasing or decreasing the diameter of the tube and/or the wall thickness of the tube will also change the amount of force required to deform the tube. Furthermore, for interlock brackets which include a seat belt anchor at the outer plate (and not at an outer end of the mounting member), a slot (as shown in FIGS. 8 and 10) may be provided at the outer plate for receiving the mounting member therethrough. The slot allows for an initial deflection of the interlock bracket in response to an initial force which may not be sufficient to deform the mounting member, yet is sufficient to deform the bracket. More particularly, the initial force deforms the bracket until a lower and/or rearward end of the slot engages the mounting member. This initial deflection of the bracket until the slot engages the mounting member is preferably great enough such that the interlock channels are at least partially engaged, which provides for an early engagement of the interlock channels before the forces are great enough to deform the mounting member or torsion tube. Further deflection of the bracket, and maybe further engagement of the channels, then occurs when the seat belt force is great enough to also deform the mounting member. Because the present invention allows for variations in the response time for the interlock mechanism to engage following an initial force, the interlock mechanism may be specifically designed or targeted for particular vehicles or particular crash characteristics of a vehicle design, in order to limit and control the forward movement of the occupant during a sudden deceleration.

Referring now to FIG. 6, interlock mechanism 14 may be positioned at a seat assembly 100, which does not include a pedestal type mounting of the seat assembly to the floor of the vehicle. In this embodiment, a lower channel 120 of interlock mechanism 14 may be secured to or formed as part of a base 116 of seat assembly 100. A lower track 112*a* of a track assembly 112 is mounted along an inner side of base 116 and channel 120. Seat 100 and interlock mechanism 14 are otherwise substantially similar to seat 10, discussed above, such that a detailed description of the components will not be repeated herein.

Figure 7:
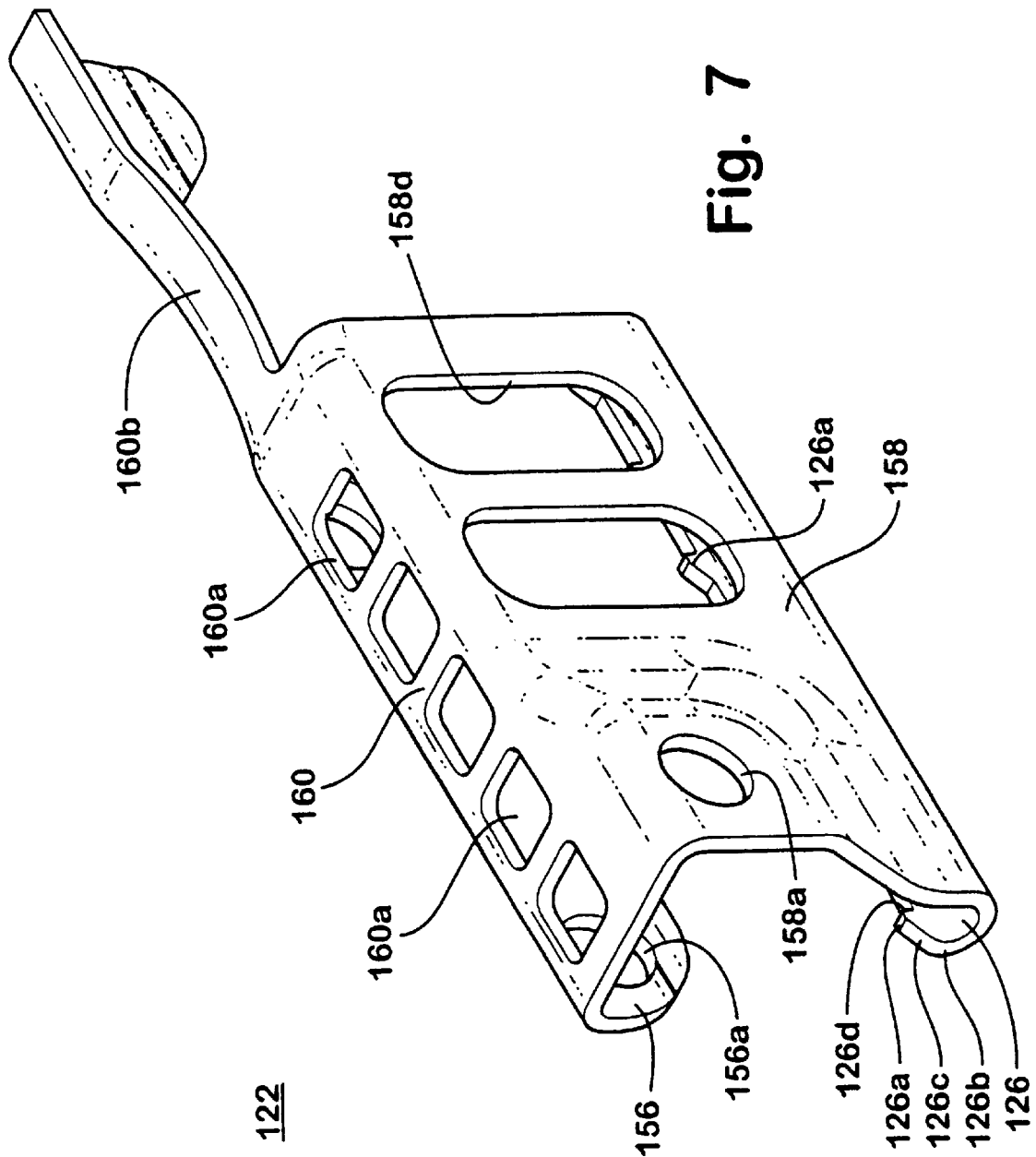
FIG. 7 is an alternate embodiment of an interlock bracket useful with the present invention.

Although interlock bracket 22, discussed above, is shown as a generally rectangular bracket with an outwardly extending seat belt mount or anchor, other forms of interlock brackets may be implemented with a corresponding fixed channel member, without affecting the scope of the present invention. For example, as shown in FIG. 7, an interlock bracket 122 may be provided which does not include a seat belt anchor. A torsion tube (not shown in FIG. 7) extends through an opening 156*a* in an inner plate 156 and further through an opening 158*a* in an outer plate 158 of bracket 122. The seat belt is anchored to an end of the torsion tube or mounting member which extends through the bracket, such that the seat belt force exerted by the seat belt during a sudden deceleration of the vehicle is directly applied to the end of the torsion tube to cause deflection thereof. Outer plate 158 of bracket 122 then deflects upwardly and forwardly relative to an inner plate 156 similar to bracket 22 discussed above. An upper flange 160 of bracket 122 is deformable to allow the relative movement of the outer plate 158 and inner plate 156. Preferably, a plurality of apertures 160*a* are formed through upper flange 160 to reduce the weight of bracket 122 and to further control deformation of upper surface 160 in response to the seat belt force at the outer end of the torsion tube. One or more apertures 158*d* may also be formed in outer plate 158 to further reduce the mass of the assembly. Similar to bracket 22, discussed above, bracket 122 also includes a channel portion 126 and a downwardly curved section 160*b* extending forwardly along inner plate 156 and/or upper flange 160. A plurality of teeth or raised projections 126*a* are provided along an upwardly turned portion 126*b* of channel 126 to engage corresponding notches or teeth of the channel member mounted at the lower track at the track assembly (not shown). Preferably, the teeth 126*a* are angle or sloped along their rearward face 126*c* and are formed with a stepped forward face 126*d* to enhance engagement of teeth 126*a* with the corresponding notches or teeth of the channel member, thereby substantially precluding forward movement of bracket 122, and thus the upper track of the seat assembly, when the teeth are engaged.

Figure 9:
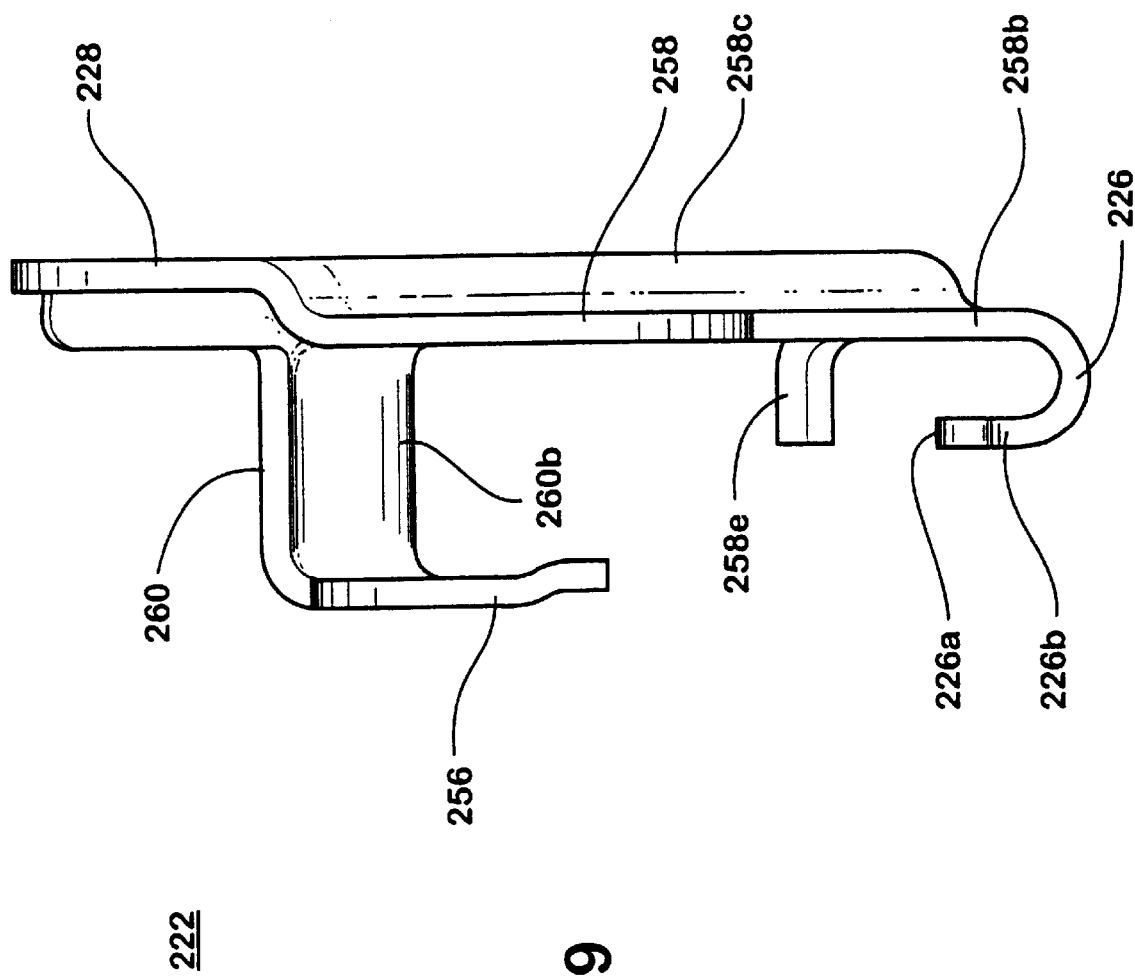
FIG. 9 is a rear elevation of the interlock bracket of FIG. 8.

Alternately, an interlock mechanism may include a interlock bracket 222 as shown in FIGS. 8 through 10. Interlock bracket 222 is substantially similar to interlock bracket 22, discussed above with respect to seat assembly 10, and includes an inner mounting plate 256 and an outer plate 258 which is connected to inner plate 256 by an upper surface plate 260. Inner plate 256 includes a mounting member opening 256*a*, while upper plate 260 includes a downwardly curved portion 260*b* extending forwardly therefrom for engagement with the gear box of the seat assembly, as discussed above. Outer plate 258 includes a torsion tube or mounting member opening 258*a* and may further include a seat belt anchor 228 for mounting the seat belt mechanism or assembly thereto. Interlock bracket 222 is smaller and preferably lighter than the interlock brackets 22 and 122, discussed above. An interlock channel 226 is provided along a lower edge 258*b* of outer plate 258, and includes an upwardly turned portion 226*b* which preferably further includes a plurality of teeth 226*a* spaced therealong. An inwardly turned flange 258*e* is provided above a forward end of the interlock channel 226 to add to the rigidity of the bracket and to limit downward movement of the forward end of outer plate 258 in response to a seat belt force exerted at seat belt anchor 228. This limits pivotal movement of bracket 222 about the mounting member to enhance the engagement of the upward turned portion 226*b* with the fixed channel member along the lower track of the seat assembly. As discussed above, one or more ribs 258*c* may be provided along outer plate 258 to further enhance the stiffness and rigidity of the interlock bracket 222.

As best seen in FIG. 10, opening 258*a* in outer plate 258 may be a slotted opening, which extends generally downwardly and rearwardly from the circular area which the torsion tube would initially be received, which is represented by the opening 256*a* in inner plate 256 in FIG. 10. The slotted opening changes the dynamics of the system during a sudden deceleration of the vehicle as discussed above. More particularly, the slotted opening allows for initial deformation of the bracket 222 in response to an upward and forward force exerted at the seat belt anchor 228. The bracket initially deforms along upper surface 260 to pull outer plate 258 upwardly and forwardly toward engagement of the channels of the interlock mechanism. The bracket deforms upwardly and forwardly until a lower end 258*f* slotted opening 258*a* contacts and engages the mounting member. At that point, further deformation of the bracket 222 is delayed until the seat belt force is sufficient to also deform the mounting member.

As also best shown in FIG. 10, a pair of mounting openings 256*b* are provided at inner plate 256 at either end of the curved portion 260*b* along inner plate 256 and/or upper plate 260. Inner plate 256 may be secured along the upper track of the track assemblies via fasteners, rivets or the like extending through openings 256b to secure inner plate to the upper track. As outer plate 258 is pulled upwardly and forwardly by the seat belt force, upper flange 260 at least partially buckles to allow movement of outer plate 258 relative to inner plate 256. Because a generally forwardly force is exerted at a rearward end 260c of downwardly curved section 260b, curved section 260b buckles or flexes downwardly to engage and/or compress the gear box, as discussed above.

Referring now to FIGS. 11–13, an interlock mechanism 314 may be implemented at a powered seat assembly 310, which includes a drive mechanism 340 for adjusting the seat and an upper track 312a relative to a lower track 312b and base 316, and thus to the floor of the vehicle. More particularly, drive mechanism 340 includes a drive motor 342 for adjusting forward and rearward movement of the seat via a gear box 344 which is operable to move upper track member 312a along lower track 312b similar to gear box 44 discussed above and as known in the art. Additionally, drive motor 342 is operable to actuate forward and rearward actuators 350 which are further operable to extend and retract a drive arm 352 at each of a pair of torsion bars 324 to rotate the torsion bars and correspondingly raise and lower a seat support 318, in a similar manner as discussed above with respect to actuators 50 of seat assembly 10. Additionally, drive mechanism 340 may include a powered recliner motor 362 which is operable to adjust an angle of the reclining member 364, at which a seat back (not shown) is mounted, via a recliner drive mechanism 366 extending generally along the track assembly 312, as best shown in FIG. 11.

Similar to seat supports 18 of seat assembly 10, seat supports 318 of seat assembly 300 are vertically adjustable in response to rotation of torsion tubes or bars 324 via mounting arms 338. However, seat supports 318 are spaced laterally inwardly from track assembly 312, while the reclining brackets 364 for mounting the seat back are positioned above and along the track assembly. This allows for height adjustment of the seat supports 318 and the seat cushion (not shown), without also raising and lowering the seat back, as is known in the art.

Interlock mechanism 314 includes channel members 320 extending along an upper portion 316b of each side of base 316 and a pair of interlock brackets 322a and 322b, positioned at opposite sides 310a and 310b of seat assembly 310. In the illustrated embodiment of FIGS. 11–13, side 310a is an inboard side of a drivers seat 310, while side 310b is an outboard side of the seat. Brackets 322a and 322b are substantially similar to one another and will thus be described together, with any differences being noted below. Channel member 320 is substantially similar to channel members 120 and 20, discussed above. As best shown in FIG. 11, the interlock brackets 322a and 322b define a housing along the track assembly 312 and around the recliner mechanism 366 at each side of seat assembly 310.

Each interlock bracket 322a, 322b includes an inner plate 356 which extends between the front and rear torsional bars 324. Interlock bracket 322a, 322a further includes an outer plate 358, 458, respectively. Outer plates 358 and 458 are generally similar to one another except that outer plate 358 at inboard bracket 322a extends only partially along the track assembly to reduce the mass of the seat assembly 310 where additional strength and rigidity is not required. Because a shoulder belt may also be secured to seat assembly 310, outboard interlock bracket 322b is preferably more robust than inboard bracket 322a, and includes outer plate 458 which extends the entire length between the two torsion bars 324, as shown in FIG. 12. Outer plate 358 and/or 458 of brackets 322a and/or 322b, respectively, may include a seat belt anchor for connection to the seat belt. For example, outer plate 358 of bracket 322a may include seat belt anchor 328a at inboard side 310a of the seat assembly 310, while at the outboard side 310b of seat 310, an end 324a of mounting tube 324 may extend through outboard interlock bracket 322b and may function as a second seat belt anchor 328b to receive a mounting portion of the seat belt mechanism. Accordingly, both ends of the seat belt or safety restraint mechanism may be secured to interlock brackets 322a and 322b of seat assembly 310. Clearly, the seat belt may be secured to mounting member or torsion tube 324 or to bracket 322a and/or 322b via any known means, without affecting the scope of the present invention. Seat assembly 310 may further provide for attachment of a shoulder belt to the back of the seat.

Each inner plate 356 of interlock brackets 322a, 322b extends between the torsion tubes 324 and is folded along an upper edge and rearward edge to form an upper surface 360 and rearward surface 361 of the respective bracket. The folded over portions are then welded or otherwise secured along a perimeter edge of the outer plates 358, 458 of the respective brackets. Additionally, a lower edge of inner plate 356 is folded outwardly to form a lower surface 363 of brackets 322a and 322b. A raised portion 363a is preferably provided along the lower surface 363 to provide clearance for gear box 344. Inner plate 356 further includes a downwardly turned outer portion or lower end 357, which extends downwardly from lower surface 363 and is welded or otherwise secured to a lower portion 358b, 458b of outer plates 358, 458, respectively. As best shown in FIG. 13, channel member 326 of interlock bracket 322a and/or 322b extends inwardly, toward track assembly 312, from the lower end portion 357 of inner plate 356 of each bracket. Channels 326 and 320 preferably include correspondingly formed teeth and/or notches 326a and 320a, respectively, and are substantially similar to the channel members discussed above with respect to interlock mechanism 14.

During sudden deceleration of the vehicle, the seat belt exerts a generally forwardly and upwardly force on seat belt anchor 328a on inboard side 310a of seat assembly 310, while a corresponding force is exerted at seat belt anchor 328b at outboard side 310b of seat assembly 310. When the seat belt force at anchors 328a and/or 328b reaches a threshold amount, outer end or ends 324a of mounting member or torsion bar 324 twists, bends or otherwise deforms or distorts upwardly and forwardly, to allow outer plates 358, 458 to pull upward on the outwardly and downwardly turned portion 357 of the respective inner plate 356 such that the channels 326 of interlock brackets 322a and/or 322b are brought into engagement with channel members 320 of base 316. Engagement of the interlock channels substantially precludes forward and/or upward motion of the seat relative to the base 316 and the floor of the vehicle. Because outer plates 358, 458 are welded or otherwise secured along the perimeter edges of lower portions 357 of the respective inner plate 356, the force exerted at the outer plates 358, 458 of the brackets is transferred to the inner plates 356 and to the channel 326 extending downwardly therefrom. The upper surface 360, rearward surface 361, and lower surface 363 flex or buckle to allow upward and/or forward movement of channel 326 relative to inner plate 356 of each bracket in response to the seat belt force. It is further envisioned that lower surface 363 may be formed such that as interlock brackets 322*a* and 322*b* are pulled upwardly and forwardly by the seat belt forces, the lower surface of the brackets functions to compress the gear box 344 and forcibly retain the gears along the rack of the track assembly 312, thereby further limiting or precluding forward movement of the seat relative to the lower track or the floor of the vehicle, as discussed above. Although the interlock brackets are shown with the inner plates or flanges being folded outwardly and downwardly and including the bracket channel, clearly the bracket channel may otherwise be formed or secured at a lower region of the outer plates or flanges, without affecting the scope of the present invention.

Accordingly, the present invention provides an interlock mechanism for a vehicle seat which is operable to engage correspondingly formed and opposed channels in response to a force at a seat belt anchor which is sufficient to deform a mounting member for a bracket of the mechanism. The interlock mechanism is thus actuable via deformation or distortion of a mounting component and thus does not include springs or the like. The present invention is thus operable to substantially preclude forward and upward movement of the seat relative to the floor of the vehicle in response to a sudden deceleration of the vehicle, while further providing smooth, unrestricted forward and rearward adjustment of the seat along the track assembly of the seat prior to the sudden deceleration. Additionally, the present invention provides for engagement with and crushing of a gear box of a powered seat to further limit or preclude forward movement of the seat relative to the track assembly of the seat.

The interlock mechanism of the present invention is operable via deformation of a mounting member or cross member of the seat assembly, and comprises a minimal number of movable parts. The dynamics of the present invention may easily be adjusted in the design phase by providing a slotted opening on the bracket or by selecting a different material or wall thickness for the mounting member for the bracket. These design characteristics may initially be ascertained by the use of engineering analysis, such as finite element analysis (FEA), and then confirmed via prototype testing. The present invention thus restricts the forward excursion of a seat occupant during a sudden deceleration of the vehicle and further provides for design control of the amount of forward excursion. This allows for adaptation of the interlock mechanism for implementation in various vehicles.

The present invention may also be adapted for various types of seats and may be equally applicable on powered seats, including four-way, six-way and eight-way powered seats and the like, and on manual seats. The interlock mechanism may be mounted at an end of a torsion tube or cross member or at a deformable mounting member secured to and extending laterally outwardly from the track assembly of the seat. A mounting member may be secured to the track assembly for some applications of the present invention, especially for manual seats which do not include a height adjustment mechanism, and thus may not include a torsional tube or cross member. Preferably, the load at the mounting member or torsion bar is directed to the central web of the upper track, so the load carrying capability of the preferred track assembly is maximized. The interlock mechanism may be positioned at one or both of the sides of the seat depending on which side of the seat the seat belt is anchored, since that side or sides will be subjected to the excessive forces created by the seat belt during a sudden deceleration of the vehicle.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A seat interlock mechanism for retaining a seat of a vehicle to a seat base during a sudden deceleration of the vehicle, the seat being adjustable forwardly and rearwardly along a track assembly positioned along opposite sides of the seat, each track assembly having an upper and lower track section, said interlock mechanism being positionable along at least one side of the seat and comprising:

a mounting member extending laterally outwardly from at least one side of the upper section of the track assembly of the seat, said mounting member comprising a deformable, elongated member extending laterally across the seat and being mountable at each end to the upper track section of a respective one of the track assemblies;

a first channel member positionable at the seat base and at least partially along the lower track section of the respective one of the track assemblies;

an interlock bracket positioned at said mounting member, said interlock bracket including a second channel member extending downwardly therefrom, said second channel member being positioned along said first channel member and at least initially spaced therefrom; and a seat belt mount positioned at one of an end of said mounting member and said interlock bracket, such that said interlock bracket is movable to engage said second channel member with said first channel member in response to deformation of said mounting member by a seat belt force at said seat belt mount which is sufficient to deform said mounting member.

2. The seat interlock mechanism of claim 1, wherein said mounting member is received within a slotted opening in said interlock bracket.

3. The seat interlock mechanism of claim 2, wherein said seat belt mount is positioned at said interlock bracket, said slotted opening providing a gap between said interlock bracket and said mounting member to delay deformation of said mounting member until after an initial deformation of said interlock bracket in response to an initial seat belt force at said seat belt mount.

4. The seat interlock mechanism of claim 1, wherein the seat is vertically adjustable via a powered seat mechanism, said mounting member comprising a torsion tube which is rotatably mounted toward each end to the upper track section of the respective track assembly.

5. A seat interlock mechanism for retaining a seat of a vehicle to a seat base during a sudden deceleration of the vehicle, the seat being adjustable forwardly and rearwardly along a track assembly, the track assembly having an upper and lower track section, said interlock mechanism being positionable along at least one side of the seat and comprising:

a mounting member extending laterally outwardly from at least one side of the upper section of the track assembly of the seat;

a first channel member positionable at the seat base and at least partially along the lower section of the track assembly;

an interlock bracket positionable at said mounting member, said interlock bracket including a second channel member extending downwardly therefrom, said second channel member being positioned along said first channel member and at least initially spaced therefrom; and a seat belt mount positioned at one of said mounting member and said interlock bracket, such that said interlock bracket is movable to engage said second channel member with said first channel member in response to a seat belt force at said seat belt mount which is sufficient to deform at least one of said mounting member and said interlock bracket, wherein said interlock bracket comprises a pair of opposite panels interconnected at least partially along an upper edge thereof, a first panel being secured at least partially along the upper section of the track assembly, while a second panel is positioned laterally outwardly therefrom, said first and second panels receiving said mounting member therethrough.

6. The seat interlock mechanism of claim 5, wherein said second panel includes a slotted opening for receiving said mounting member, said slotted opening being sized in accordance with a sufficient deformation of said interlock bracket to engage said second channel with said first channel.

7. The seat interlock mechanism of claim 5, wherein said mounting member is a torsion tube extending laterally across the seat and being rotatably mounted at each end to the upper section of the track assembly, said first and second panels rotatably receiving said torsion tube therethrough.

8. The seat interlock mechanism of claim 1, wherein the seat is forwardly and rearwardly adjustable via a powered seat adjustment mechanism which comprises a drive member along the track assembly.

9. The seat interlock mechanism of claim 8, wherein said interlock bracket comprises a locking extension which functions to compress at least a portion of the drive member to retain the drive member in engagement with the track assembly in response to deformation of said mounting member.

10. The seat interlock mechanism of claim 1, wherein said first and second channels interconnect to substantially limit relative forward movement therebetween when said first and second channels are engaged.

11. A seat interlock mechanism for retaining a seat of a vehicle to a seat base during a sudden deceleration of the vehicle, the seat being adjustable forwardly and rearwardly along a track assembly, the track assembly having an upper and lower track section, said interlock mechanism being positionable along at least one side of the seat and comprising:

a mounting member extending laterally outwardly from at least one side of the upper section of the track assembly of the seat;

a first channel member positionable at the seat base and at least partially along the lower section of the track assembly;

an interlock bracket positionable at said mounting member, said interlock bracket including a second channel member extending downwardly therefrom, said second channel member being positioned along said first channel member and at least initially spaced therefrom, wherein said second channel comprises a plurality of raised portions therealong which are engagable with corresponding notches along said first channel, said first and second channels interconnecting to substantially limit relative forward movement therebetween when said first and second channels are engaged; and a seat belt mount positioned at one of said mounting member and said interlock bracket, such that said interlock bracket is movable to engage said second channel member with said first channel member in response to a seat belt force at said seat belt mount which is sufficient to deform at least one of said mounting member and said interlock bracket.

12. The seat interlock mechanism of claim 1, wherein said interlock mechanism is positionable along both sides of the seat.

13. A seat for a vehicle, the vehicle having a floor, said seat comprising:

a seat base securable to the floor of the vehicle;

a track assembly comprising an upper track and a lower track and being positioned along opposite sides of said seat, said lower track being secured along said seat base;

a seat support mounted at said upper track;

a mounting member extending laterally across said seat and outwardly from said upper track, said mounting member comprising a deformable, elongated member mounted at each end to said upper track of said track assembly along a respective side of said seat;

a seat interlock mechanism comprising a first channel positioned along said lower track and an interlock bracket mounted at said upper track and said mounting member, said interlock bracket including a second channel which is aligned with and at least initially spaced from said first channel; and a seat belt mount positioned at one of said interlock bracket and said mounting member, said interlock bracket being operable to engage said second channel with said first channel in response to deformation of said mounting member by a seat belt force at said seat belt mount which is sufficient to deform said mounting member.

14. The seat interlock mechanism of claim 13, wherein said first channel is integrally formed with said seat base.

15. The seat of claim 13, wherein said first and second channels are operable to non-slidably engage one another in response to the seat belt force.

16. A seat for a vehicle, the vehicle having a floor, said seat comprising:

a seat base securable to the floor of the vehicle;

a track assembly comprising an upper track and a lower track, said lower track being secured along said seat base;

a seat support mounted at said upper track;

a mounting member extending laterally outwardly from said upper track;

a seat interlock mechanism comprising a first channel positioned along said lower track and an interlock bracket mounted at said upper track and said mounting member, said interlock bracket including a second channel which is aligned with and at least initially spaced from said first channel; and a seat belt mount positioned at one of said interlock bracket and said mounting member, said interlock bracket being operable to engage said second channel with said first channel in response to a seat belt force at said seat belt mount which is sufficient to deform at least one of said mounting member and said interlock bracket, wherein said interlock bracket comprises a first panel and a second panel connected at least partially along an upper edge thereof, said first panel being secured to said upper track and said second panel being laterally outwardly positioned from said first panel, said first and second panel receiving said mounting member therethrough.

17. The seat of claim 16, wherein said mounting member is an elongated cross member extending laterally across said seat, at least one end of said cross member extending laterally outwardly from said upper track.

18. The seat of claim 17, wherein said seat comprises a powered seat mechanism for adjusting a height of said seat support via rotation of said cross member, said interlock bracket rotatably receiving said at least one end of said cross member.

19. The seat of claim 16, wherein said second panel receives said mounting member through a slotted opening to provide an initial deformation of said interlock bracket which is sufficient to at least partially engage said first and second channels in response to an initial seat belt force.

20. The seat of claim 13, wherein said seat is a powered adjustable seat, said upper track being adjusted forwardly and rearwardly relative to said lower track via a powered seat mechanism.

21. A seat for a vehicle, the vehicle having a floor, said seat comprising:
  a seat base securable to the floor of the vehicle;
  a track assembly comprising an upper track and a lower track, said lower track being secured along said seat base, said seat comprising a powered adjustable seat, said upper track being adjusted forwardly and rearwardly relative to said lower track via a powered seat mechanism;
  a seat support mounted at said upper track;
  a mounting member extending laterally outwardly from said upper track;
  a seat interlock mechanism comprising a first channel positioned along said lower track and an interlock bracket mounted at said upper track and said mounting member, said interlock bracket including a second channel which is aligned with and at least initially spaced from said first channel; and
  a seat belt mount positioned at one of said interlock bracket and said mounting member, said interlock bracket being operable to engage said second channel with said first channel in response to a seat belt force at said seat belt mount which is sufficient to deform at least one of said mounting member and said interlock bracket, wherein said interlock bracket includes a locking arm which functions to compress a portion of said powered seat mechanism in response to deformation of said mounting member to substantially limit relative movement of said track assembly relative to said portion of said powered seat mechanism.

22. The seat of claim 13, wherein said interlock mechanism is positioned at both sides of said seat.

23. A powered seat for a vehicle having a floor, said powered seat comprising:
  a seat base securable to the floor of the vehicle;
  a track assembly comprising an upper track and a lower track, said lower track being secured along said seat base, said upper track being movable along said lower track;
  an elongated torsion tube extending laterally across the seat, at least one end of said torsion tube extending laterally outwardly from said upper track;
  a seat support mounted to said torsion tube;
  a powered drive mechanism which is operable to move said upper track forwardly and rearwardly with respect to said lower track;
  a seat interlock mechanism comprising a first channel positioned along said lower track and an interlock bracket mounted at said upper track and at least one end of said torsion tube, said interlock bracket comprising first and second plates connected along an upper edge thereof, said second plate being positioned laterally outwardly from said first plate and including a second channel extending downwardly therefrom, said second channel being aligned with and at least initially spaced from said first channel; and
  a seat belt mount positioned at one of said interlock bracket and said end of said torsion tube, said interlock bracket being operable to engage said second channel with said first channel in response to a seat belt force at said seat belt mount which is sufficient to deform said torsion tube.

24. The seat interlock mechanism of claim 23, wherein said first channel is integrally formed with said seat base.

25. The powered seat of claim 23, wherein said powered drive mechanism is further operable to adjust a height of said seat support via rotation of said torsion tube, said interlock bracket rotatably receiving said torsion tube therethrough.

26. The powered seat of claim 23, wherein said first plate of said interlock bracket includes a locking extension extending therefrom for engagement with a portion of said powered drive mechanism to substantially retain said portion of said powered drive mechanism to said track assembly in response to said seat belt force at said seat belt mount.

27. A powered seat for a vehicle having a floor, said powered seat comprising:
  a seat base securable to the floor of the vehicle;
  a track assembly comprising an upper track and a lower track, said lower track being secured along said seat base, said upper track being movable along said lower track;
  an elongated torsion tube extending laterally across the seat, at least one end of said torsion tube extending laterally outwardly from said upper track;
  a seat support mounted to said torsion tube;
  a powered drive mechanism which is operable to move said upper track forwardly and rearwardly with respect to said lower track;
  a seat interlock mechanism comprising a first channel positioned along said lower track and an interlock bracket mounted at said upper track and at least one end of said torsion tube, said interlock bracket comprising first and second plates connected along an upper edge thereof, said second plate being positioned laterally outwardly from said first plate and including a second channel extending downwardly therefrom, said second channel being aligned with and at least initially spaced from said first channel; and
  a seat belt mount positioned at one of said interlock bracket and said end of said torsion tube, said interlock bracket being operable to engage said second channel with said first channel in response to a seat belt force at said seat belt mount which is sufficient to deform at least one of said torsion tube and said interlock bracket, wherein said first and second channels of said interlock mechanism comprise corresponding teeth at least partially therealong, such that forward movement of said upper track relative to said lower track is substantially limited by engagement of said teeth of said first and second channels.

28. The seat interlock mechanism of claim 27, wherein said teeth of said first channel comprise a plurality of semi-shear indentations along said first channel, said teeth of said second channel comprising at least one raised portion at said second channel.

29. An interlock mechanism for substantially limiting forward movement of a seat of a vehicle in response to a seat belt force being exerted at the seat during a sudden deceleration of the vehicle, the vehicle seat being mounted at a track assembly, and having a drive mechanism which is operable to rotatably actuate at least one gear member at a rack extending along the track assembly for adjusting the seat forwardly and rearwardly along the track assembly, said interlock mechanism comprising:

an interlock bracket mounted at the track assembly, the seat belt being anchored at said interlock bracket, an engaging portion of said interlock bracket extending therefrom and at least initially being positioned adjacent to the gear member at the track assembly, said engaging portion being operable to engage and compress the gear member to retain engagement of the gear member to the rack to substantially limit forward movement of the seat in response to a seat belt force sufficient to move at least a portion of said interlock bracket.

30. The interlock mechanism of claim 29, wherein said interlock bracket is mounted at a deformable member extending laterally outwardly from the track assembly, said interlock bracket being movable in response to a seat belt force sufficient to deform said deformable member.

31. The interlock mechanism of claim 30 further including a first channel member extending along the track assembly, said interlock bracket further including a second channel member which is aligned with and initially spaced from said first channel member, said interlock bracket being movable to engage said second channel with said first channel to limit forward movement of the seat.

32. The seat interlock mechanism of claim 31, wherein said first channel member is configured to be integrally formed with a base of the seat of the vehicle.

33. The interlock mechanism of claim 31, wherein said first and second channel members include corresponding raised portions for engagement with the raised portions of the other channel member to further limit forward movement of the seat.

34. The seat interlock mechanism of claim 33, wherein said first channel comprises a plurality of semi-shear indentations therealong which are engagable with said raised portion of said second channel.

35. A seat interlock mechanism for retaining a seat of a vehicle to a seat base during a sudden deceleration of the vehicle, the seat being adjustable forwardly and rearwardly along a track assembly, the track assembly having an upper and lower track section, said interlock mechanism being positionable along at least one side of the seat and comprising:

a mounting member extending laterally outwardly from at least one side of the upper section of the track assembly of the seat;

a first channel member positionable at the seat base and at least partially along the lower section of the track assembly;

an interlock bracket positionable at said mounting member, said interlock bracket including a second channel member extending downwardly therefrom, said second channel member being positioned along said first channel member and at least initially spaced therefrom, wherein said first channel member comprises a plurality of semi-shear indentations therealong which are engagable with at least one raised portion at said second channel member, said first and second channels interconnecting to substantially limit relative forward movement therebetween when said first and second channels are engaged; and a seat belt mount positioned at one of said mounting member and said interlock bracket, such that said interlock bracket is movable to engage said second channel member with said first channel member in response to a seat belt force at said seat belt mount which is sufficient to deform at least one of said mounting member and said interlock bracket.

36. The seat interlock mechanism of claim 1, wherein said first channel member is configured to be integrally formed with the seat base of the seat of the vehicle.

37. A seat for a vehicle, the vehicle having a floor, said seat comprising:

a seat base securable to the floor of the vehicle;

a track assembly comprising an upper track and a lower track, said lower track being secured along said seat base;

a seat support mounted at said upper track;

a mounting member extending laterally outwardly from said upper track;

a seat interlock mechanism comprising a first channel positioned along said lower track and an interlock bracket mounted at said upper track and said mounting member, said interlock bracket including a second channel which is aligned with and at least initially spaced from said first channel, wherein said first channel comprises a plurality of semi-shear indentations therealong which are engagable with at least one raised portion at said second channel; and a seat belt mount positioned at one of said interlock bracket and said mounting member, said interlock bracket being operable to engage said second channel with said first channel in response to a seat belt force at said seat belt mount which is sufficient to deform at least one of said mounting member and said interlock bracket, said first and second channels being operable to non-slidably engage one another in response to the seat belt force.

\* \* \* \* \*